US012461936B2

(12) United States Patent
Stinger et al.

(10) Patent No.: US 12,461,936 B2
(45) Date of Patent: Nov. 4, 2025

(54) SYNCHRONIZING CHANGES IN A DISTRIBUTED SYSTEM WITH INTERMITTENT CONNECTIVITY

(71) Applicant: REDLIST, LLC, Pleasant Grove, UT (US)

(72) Inventors: Logan Stinger, Pleasant Grove, UT (US); John Wilson, Pleasant Grove, UT (US); Kody Holman, Pleasant Grove, UT (US); Talmage Wagstaff, Pleasant Grove, UT (US)

(73) Assignee: REDLIST, LLC, Pleasant Grove, UT (US)

( * ) Notice: Subject to any disclaimer, the term of this patent is extended or adjusted under 35 U.S.C. 154(b) by 0 days.

(21) Appl. No.: 18/219,028

(22) Filed: Jul. 6, 2023

(65) Prior Publication Data

US 2024/0012835 A1    Jan. 11, 2024

Related U.S. Application Data

(60) Provisional application No. 63/359,312, filed on Jul. 8, 2022.

(51) Int. Cl.
*G06F 16/27* (2019.01)
*G06F 16/2453* (2019.01)
*G06F 16/25* (2019.01)

(52) U.S. Cl.
CPC ........ *G06F 16/27* (2019.01); *G06F 16/24532* (2019.01); *G06F 16/252* (2019.01)

(58) Field of Classification Search
CPC ... G06F 16/27; G06F 16/24532; G06F 16/252
See application file for complete search history.

(56) References Cited

U.S. PATENT DOCUMENTS

| 5,678,046 A | * | 10/1997 | Cahill | G06Q 40/02 |
| | | | | 707/999.009 |
| 6,374,248 B1 | * | 4/2002 | Nazari | H04L 67/63 |
| 9,547,704 B1 | * | 1/2017 | Deus | G06F 16/27 |

(Continued)

FOREIGN PATENT DOCUMENTS

| CN | 103428462 A | * | 12/2013 | |
| CN | 108449289 A | * | 8/2018 | H04L 49/25 |

(Continued)

OTHER PUBLICATIONS

International Searching Authority, International Search Report and the Written Opinion, Nov. 6, 2023.

*Primary Examiner* — Neveen Abel Jalil
*Assistant Examiner* — Hubert Cheung
(74) *Attorney, Agent, or Firm* — Bryant J. Keller; Kirton McConkie

(57) ABSTRACT

Changes can be synchronized in a distributed system with intermittent connectivity. A synchronization coordinator on a server and an application on mobile devices can be configured to synchronize a shared dataset using file transfers. By transferring files, the application on the mobile device can synchronize large, shared datasets via a long-running task without needing to remain active on the mobile device until the task is completed. The synchronization coordinator and applications can use unique identifiers to identify storage locations by which the files are transferred.

25 Claims, 14 Drawing Sheets

(56) References Cited

U.S. PATENT DOCUMENTS

| | | | |
|---|---|---|---|
| 9,830,335 B1* | 11/2017 | Tibble | G06F 16/1873 |
| 2005/0086288 A1* | 4/2005 | Datta | H04L 67/1046 |
| | | | 709/201 |
| 2007/0043693 A1* | 2/2007 | Krieg | G06F 16/86 |
| 2009/0077263 A1* | 3/2009 | Koganti | H04L 67/1095 |
| | | | 709/248 |
| 2010/0293585 A1* | 11/2010 | Xia | H04L 65/80 |
| | | | 725/109 |
| 2012/0278370 A1* | 11/2012 | Nichols | G06F 16/185 |
| | | | 707/812 |
| 2014/0304297 A1* | 10/2014 | Lian | G06F 16/148 |
| | | | 707/769 |
| 2015/0248466 A1* | 9/2015 | Jernigan, IV | G06F 11/0793 |
| | | | 707/632 |
| 2015/0261782 A1* | 9/2015 | McFerrin | G06F 3/06 |
| | | | 707/625 |
| 2016/0119290 A1* | 4/2016 | Balasubramanian | |
| | | | G06F 21/6254 |
| | | | 726/30 |
| 2017/0300530 A1 | 10/2017 | Tang et al. | |
| 2020/0226123 A1* | 7/2020 | Nixon | G06F 16/2379 |
| 2020/0366706 A1 | 11/2020 | Sexton et al. | |
| 2021/0224334 A1* | 7/2021 | Shrinivasan | G06F 16/2272 |
| 2021/0234713 A1* | 7/2021 | Nagasawa | H04L 12/1435 |
| 2021/0390141 A1* | 12/2021 | Jacob | G06F 9/3877 |
| 2023/0171217 A1* | 6/2023 | Fritz | G06F 11/0709 |
| | | | 709/206 |
| 2023/0188577 A1* | 6/2023 | Venkiteswaran | G06F 16/904 |
| | | | 709/204 |
| 2023/0237029 A1* | 7/2023 | Tal | G06F 16/215 |
| | | | 707/692 |
| 2023/0376496 A1* | 11/2023 | Jacob | G06F 16/285 |

FOREIGN PATENT DOCUMENTS

| | | | | |
|---|---|---|---|---|
| CN | 111324914 A | * | 6/2020 | G06F 16/27 |
| CN | 112700251 A | * | 4/2021 | G06F 16/2379 |
| CN | 112948355 A | * | 6/2021 | G06F 16/219 |
| CN | 113688415 A | * | 11/2021 | G06F 21/6218 |
| CN | 114513501 A | * | 5/2022 | G06F 16/24552 |
| JP | 2000183929 A5 | * | 3/2006 | |
| KR | 2007108616 A | * | 11/2007 | G06F 17/30675 |
| WO | WO-2012000272 A1 | * | 1/2012 | G06F 11/1417 |

* cited by examiner

SYNCHRONIZING CHANGES IN A DISTRIBUTED SYSTEM WITH INTERMITTENT CONNECTIVITY

CROSS-REFERENCE TO RELATED APPLICATION

This application claims the benefit of U.S. Provisional Patent Appl. No. 63/359,312 which was filed on Jul. 8, 2022; the entire disclosure of which is incorporated herein.

BACKGROUND

Even with widespread cellular coverage, there are still scenarios where mobile devices in distributed systems may lack connectivity. In this context, a distributed system can be viewed as a system that includes server-side components (e.g., cloud-based components) and client-side components (e.g., a mobile application or browser application). For example, in the construction, energy, mining, and other industries, workers may be outside the range of cellular/internet providers while using a distributed system.

In such scenarios, it can be difficult to maintain consistency in the distributed system. This is particularly true when the client-side components are used to create and/or change shared data within the distributed system. For example, personnel that perform asset management, compliance, or similar tasks may use a mobile application to log data for such tasks. When the personnel's mobile devices have consistent connectivity, such data can be easily synchronized throughout the distributed system (e.g., by immediately synchronizing small changes to a backend database). In contrast, if the personnel's mobile devices may only have intermittent connectivity, synchronizing the data can be difficult and error prone.

BRIEF SUMMARY

The described systems and methods relate to systems, methods, and computer program products for synchronizing changes in a distributed system with intermittent connectivity. A synchronization coordinator on a server and an application on mobile devices can be configured to synchronize a shared dataset using file transfers. By transferring files, the application on the mobile device can synchronize large, shared datasets via a long-running task without needing to remain active on the mobile device until the task is completed. The synchronization coordinator and applications can use unique identifiers to identify storage locations by which the files are transferred.

In some implementations, the described systems and methods are implemented by an application on a mobile device as a method for synchronizing a dataset in a distributed system. The synchronization coordinator can receive a request for a dataset from an application executing on a mobile device. The synchronization coordinator can send a confirmation ID to the application. The synchronization coordinator can access a database to retrieve the dataset. The synchronization coordinator can create one or more files that contain the dataset. The synchronization coordinator can store the one or more files in a location in a file store, the location being associated with the confirmation ID to thereby enable the application to retrieve the one or more files using the confirmation ID.

In some implementations, the described systems and methods are implemented by an application on a mobile device as a method for synchronizing a dataset in a distributed system. The application can send a request for a dataset to a synchronization coordinator that executes on a server. The application can receive a confirmation ID from the synchronization coordinator. The application can use the confirmation ID to access a location in a file store. The application can download one or more files stored at the location in the file store. The application can extract the dataset from the one or more files. The application can store the dataset in a local database on the mobile device.

In some implementations, the described systems and methods are implemented as computer storage media storing computer executable instructions, which when executed implement a method for synchronizing changes in a distributed system. A synchronization coordinator can receive a request for a dataset from an application executing on a mobile device. The dataset can be stored in a database on a server. The synchronization coordinator can send an identifier for the request. The synchronization coordinator can store one or more files in a location of a file store. The location can be defined using the identifier for the request. The one or more files can contain the dataset. The application can use the identifier for the request to access the location of the file store to download the one or more files. The application can extract the dataset from the one or more files. The application can store the dataset in a local database on the mobile device.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the described systems and methods, and are not therefore to be considered limiting of its scope, the described systems and methods will be described and explained with additional specificity and detail through the use of the accompanying drawings in which.

DETAILED DESCRIPTION

In this specification and the claims, the term mobile device and variations thereof can be construed as encompassing smart phones, tablets, and other similar end user devices. The term server can be construed as encompassing any arrangement of hardware, whether physical and/or virtual, which can be used to host server-side components of a distributed system. For example, a server could by one or more standalone server computing devices, or can represent the collection of components by which a distributed system is hosted in the cloud (e.g., Microsoft Azure, Amazon Web Services, Google Cloud, etc.).

Figure 1:
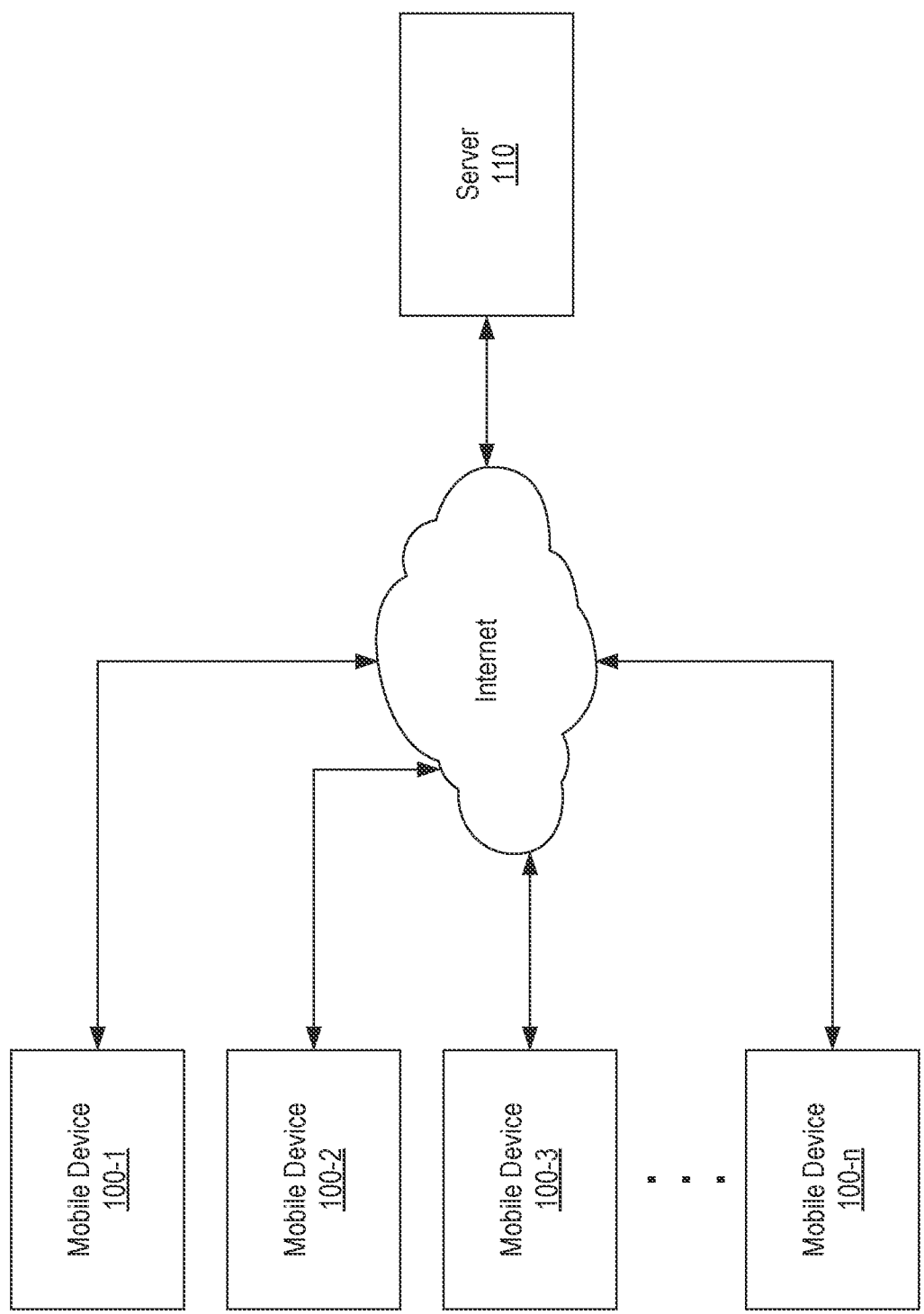
FIG. 1 provides an example of a computing environment in which embodiments of the present invention may be implemented.

FIG. 1 provides an example of a computing environment in which embodiments of the present invention can be implemented. In accordance with some embodiments, the computing environment includes mobile devices 100-1 through 100-n (which can individually and collectively be referred to as mobile device(s) 100) and a server 110. Mobile devices 100 can be interconnected with server 110 via the internet (or possibly some other network). As one example, server 110 could represent a cloud platform and mobile devices 100 could represent smart phones carried by workers while at a job site where a cellular signal is intermittently available. Although embodiments of the present invention are particularly beneficial in intermittent connectivity environments, they should not be limited to such environments.

Figure 2:
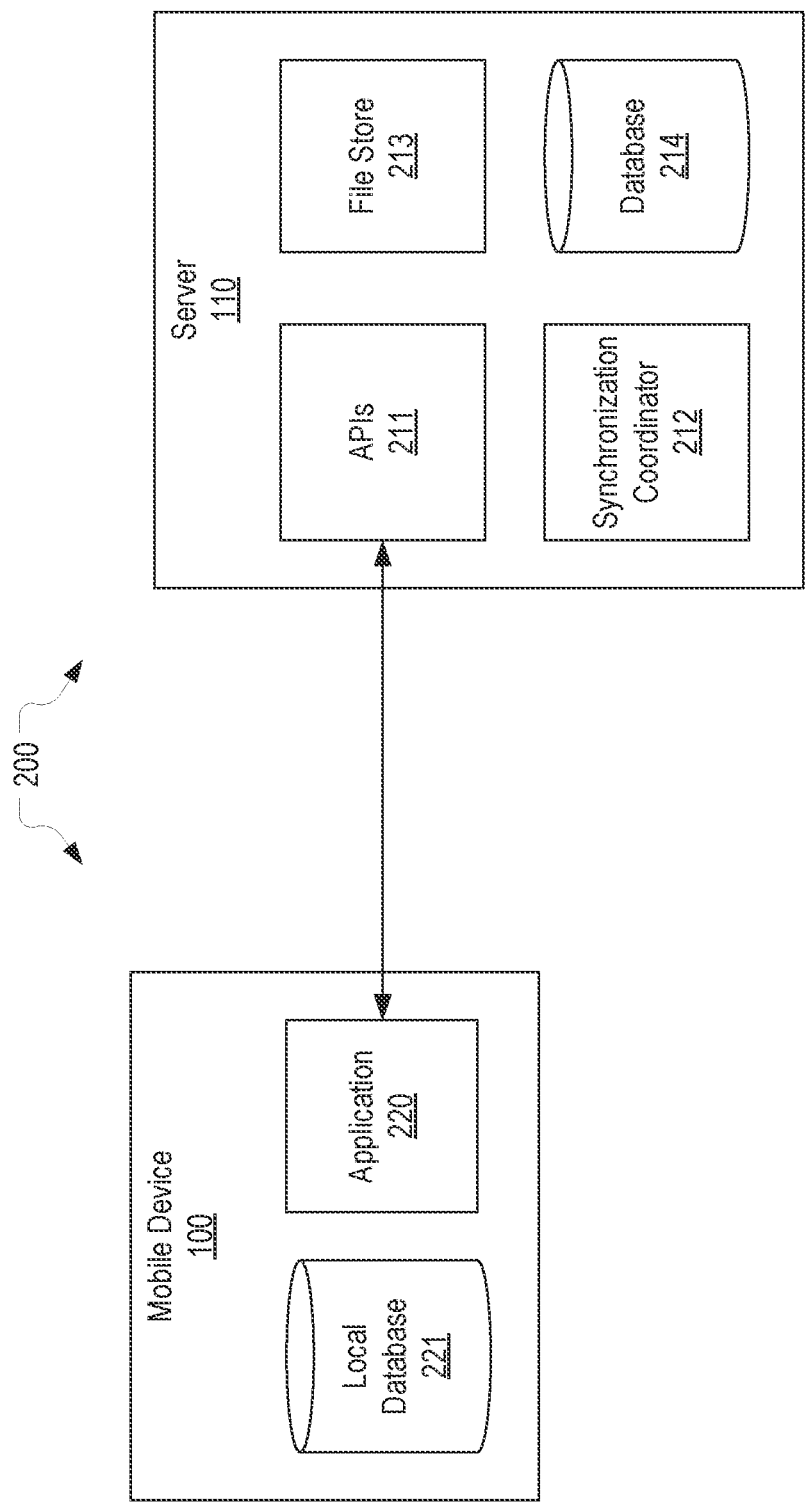
FIG. 2 provides an example of components of a distributed system that is configured in accordance with one or more embodiments of the present invention.

FIG. 2 provides an example of a distributed system 200 that can be configured to synchronize changes in accordance with one or more embodiments of the present invention. Distributed system 200 can include server-side components, such as application programming interfaces (APIs) 211, a synchronization coordinator 212, a file store 213, and a database 214, among possibly other components, and client-side components such as application 220 and local database 221, among possibly other components.

Application 220 can be a mobile application, a webpage or browser application, or any other component(s) that can be deployed on mobile device 100 to perform the functionality described herein. APIs 211 can represent the mechanisms or functionality by which application 220 can interface with synchronization coordinator 212. Synchronization coordinator 212 can represent one or more components that are configured to implement the functionality described herein for synchronizing database 214 with local database 221 using files. Database 214 can represent any suitable type of database and can be used to store data of distributed system 200 that can be concurrently accessed by mobile devices 100. Local database 221 can represent any suitable type of database by which application 220 stores any portion of a dataset that it retrieves from database 214 including when mobile device 100 does not have connectivity. File store 213 can represent any suitable mechanism for storing files communicated between application 220 and the server-side components (e.g., Azure blob storage).

In many instances, the operating system of mobile devices 100 will not allow applications, such as application 220, to make internet communications when the application is not active. For example, if the user turns off the screen of mobile device 100 while an application is actively communicating over the internet, the operating system will (in some cases) prevent the application from making further communications. This may not be problematic for an application that transfers small amounts of data. In contrast, if the application needs to transfer a large amount of data, it is likely that the user may not keep the application active long enough to complete the transfer or, at a minimum, the user would be required to keep the application active until the transfer is completed (e.g., by not turning off the screen or switching to a different application). In distributed system 200, due to the intermittent connectivity that mobile device 100 may likely have, application 220 may oftentimes need to obtain a large amount of data from database 214 or provide a large amount of data to database 214. In accordance with some embodiments, distributed system 200 is configured to enable such data to be transferred for synchronization without the requirement that application 220 remain active on mobile device 100.

As an overview, some embodiments of the described systems and methods leverage files to transfer datasets between database 214 and local database 221. For example, when mobile device 100 has connectivity, application 220 can retrieve a dataset, such as a task list for inventory management, contained in database 214 in the form of files that are retrieved from file store 213. The dataset contained in such files can be stored in local database 221 to allow application 220 to access the dataset even when offline. The user of mobile device 100 can make changes to dataset while it is stored in local database 221. To synchronize any changes to the dataset in local database 221 to database 214, application 220 can create files containing the dataset from local database 221 and transfer the files to file store 213. Synchronization coordinator 212 can then process the files to synchronize the dataset in the files with database 214. Because the dataset is transferred in the form of files, application 220 can perform the transfers even when it is not active on mobile device 100. In this way, the dataset can be synchronized whenever mobile device 100 obtains connectivity to server 110 as opposed to only when application 220 is active and mobile device 100 has connectivity.

Figure 3:
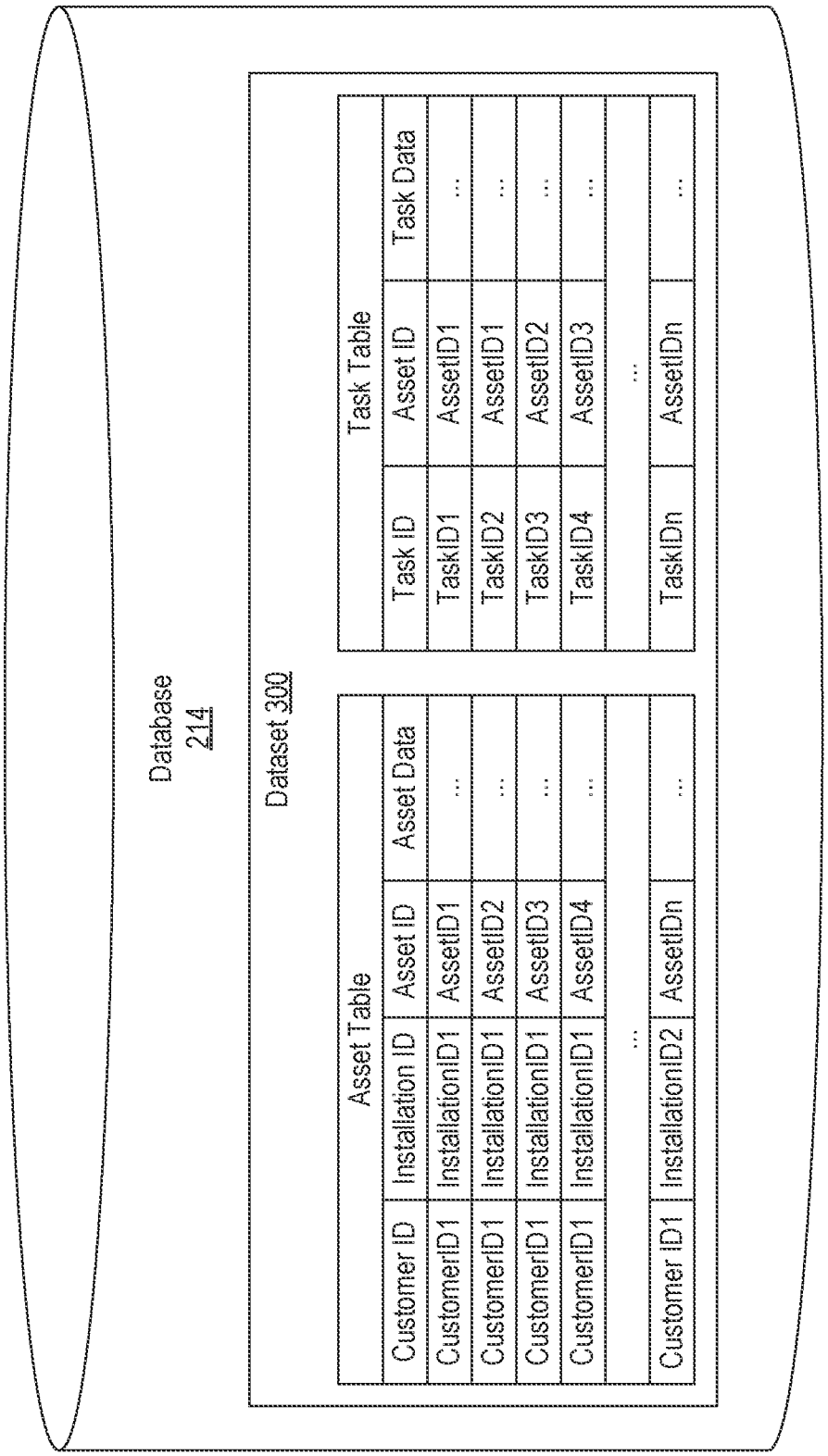
FIG. 3 provides an example of a dataset that may be used in embodiments of the present invention.

FIG. 3 provides a simple example of a dataset 300 that can be stored in database 214. Dataset 300 is assumed to pertain to a customer that uses distributed system 200 to manage tasks that are performed on assets at multiple installations (e.g., locations). For example, the customer could be a developer that has machinery on which tasks are to be performed on a periodic basis (e.g., oil changes, safety checks, etc.). For simplicity, dataset 300 is shown as being divided into an asset table that associates an asset ID of each asset with an installation ID and customer ID and defines asset data for the asset, and a task table that associates a task ID with the asset ID of the asset to which the task pertains and task data. In the example, it is assumed that the customer having a customer ID of CustomerID1 has two installations at which assets are located or otherwise grouped. The asset data could be information identifying the asset and the task data could be information defining the task. Assets and tasks are only one example of the type of data that could be used in distributed system 200, and embodiments of the described systems and methods could be implemented when distributed system 200 is used to provide access to any type of data. In some embodiments, the data structures that distributed system 200 uses to contain asset data and task data (or any other type of data) when such data is sent to mobile devices can be considered as different types of model objects. In other words, a model object can be for a mobile-side representation of a particular type of server-side data. For example, asset data that is stored in the asset table and that defines a particular customer's assets can be structured in an asset model object and sent to a mobile device used by an employee of the particular customer.

Using the example in FIG. 3, multiple users, such as employees of the customer, could use mobile devices 100 to access application 220 to track their performance of tasks on the assets. In such a case, distributed system 200 can enable application 220 to obtain dataset 300, or a portion thereof, for storage in local database 221 and to synchronize the local copy of dataset 300 back to database 214 using file transfers that can be seamlessly performed even when mobile devices 100 have intermittent connections to server 110.

FIGS. 4A-4E provide an example of functionality that distributed system 200 can perform to allow application 220 to synchronize local database 221 to database 214, or in other words, to allow application 220 to obtain the current dataset from database 214. This example is based on dataset 300 shown in FIG. 3. It will be assumed that local database 221 does not currently store any of dataset 300, but similar functionality could be performed when local database 221 stores an old version of dataset 300 (e.g., to entirely replace the old version or to update it).

Figure 4A:
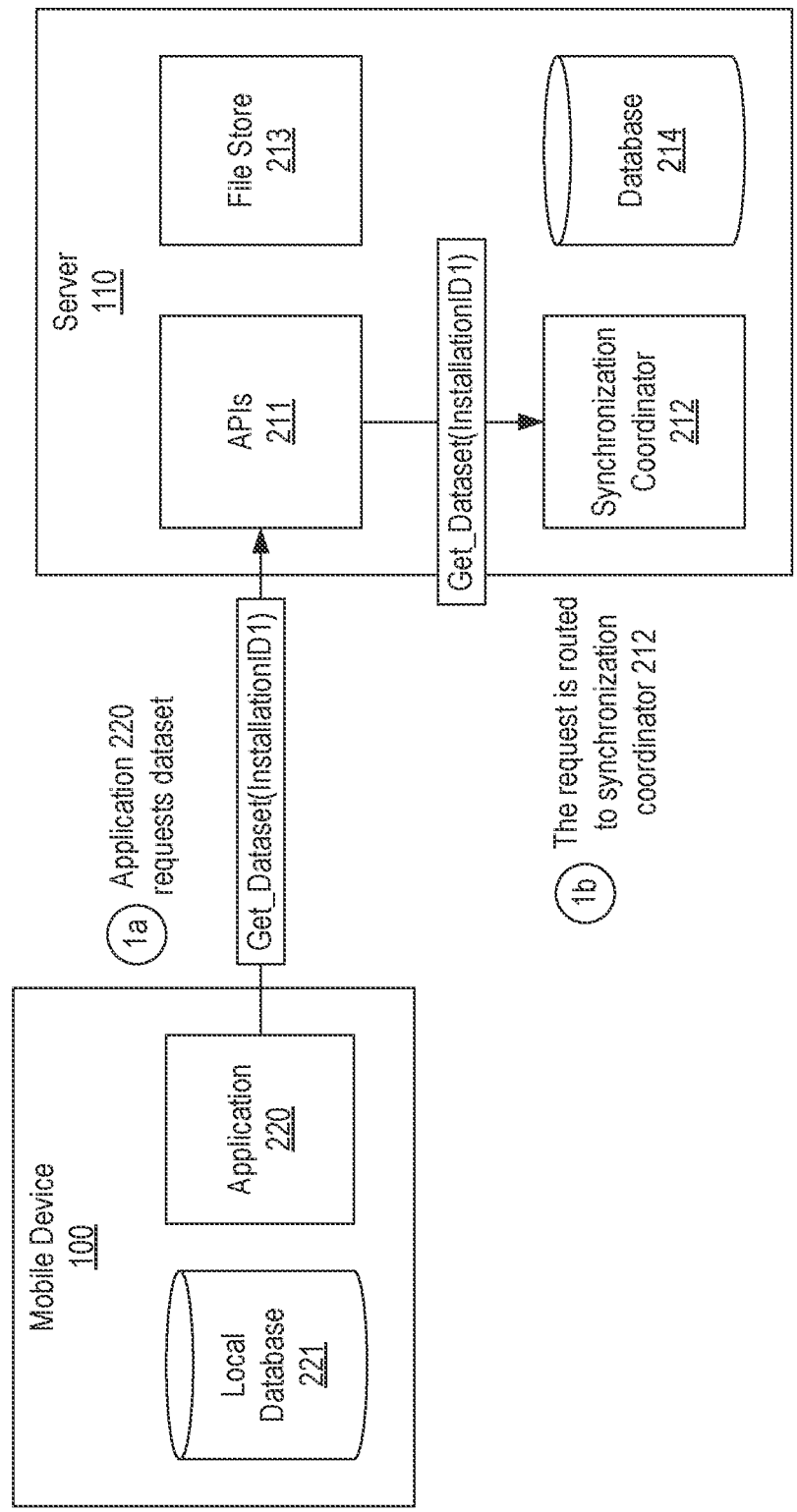
FIGS. 4A-4E provide an example of how a dataset can be synchronized to a mobile device using files in accordance with one or more embodiments of the present invention.

Turning to FIG. 4A, in step 1a, application 220 submits a request to APIs 211 to obtain a dataset. Applicant 220 can submit this request in response to a number of determinations. For example, when mobile device 100 has intermittent connectivity, application 220 could submit the request upon determining that mobile device 100 has connectivity and/or upon receiving a request from a user. Alternatively or additionally, application 220 can submit the request at a particular time or after an elapsed amount of time such as each morning or after 24 hours has elapsed since the last request for a dataset. As shown, the request for the dataset could specify an installation ID to be used to identify the dataset (e.g., all entries in the asset table of dataset 300 matching the installation ID and the corresponding entries in the task table). Alternatively, the request for the dataset can specify the customer ID to retrieve the entirety of dataset 300. Accordingly, the request for a dataset can be used to retrieve all or a portion of the customer's dataset stored in database 214, which is dataset 300 in this example. In step 1b, APIs 211 can route the request to synchronization coordinator 212.

Figure 4B:
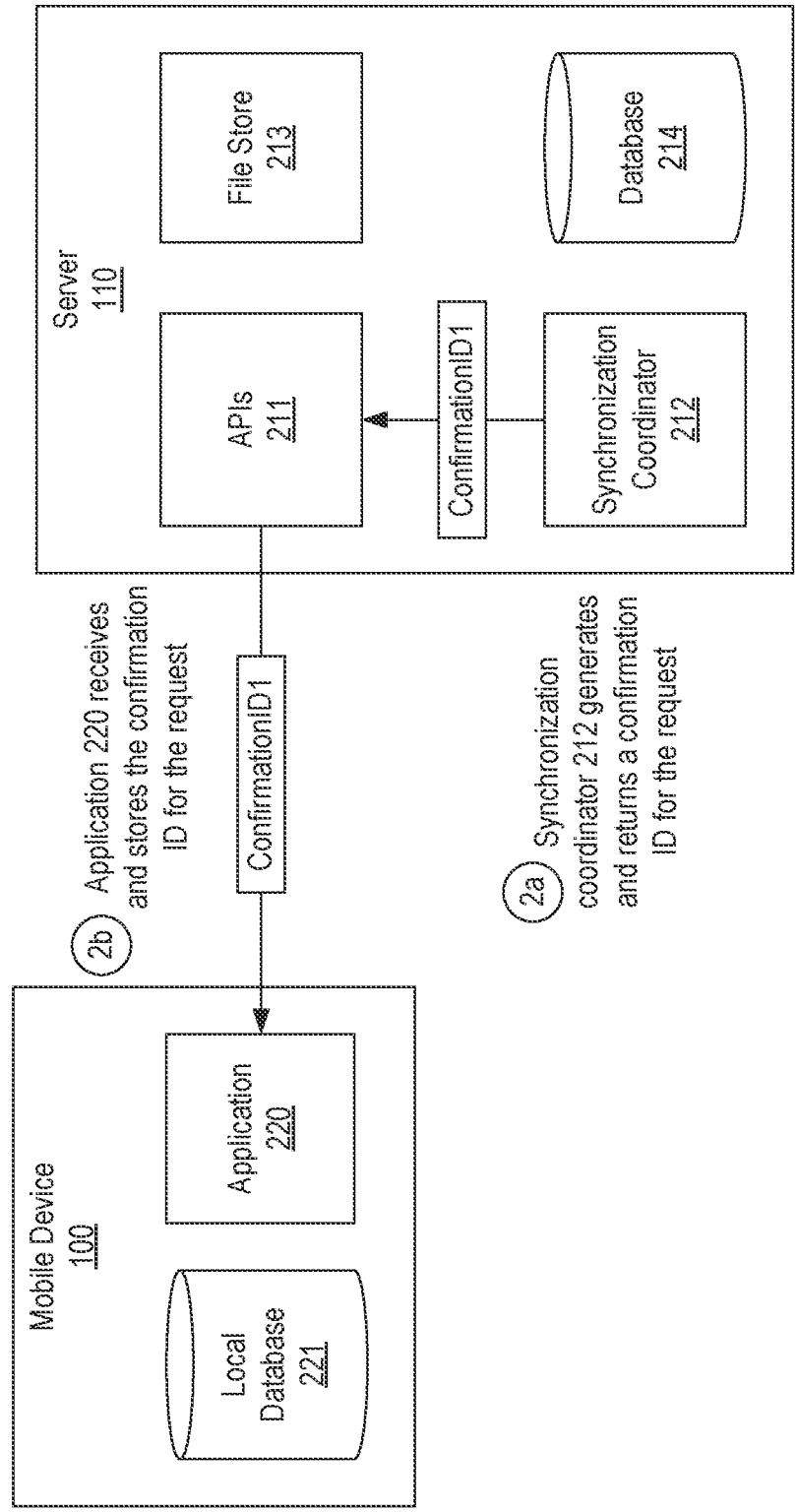

Turning to FIG. 4B, in step 2a, synchronization coordinator 212 can (in accordance with some embodiments) create a confirmation ID (ConfirmationID1) for the request for the dataset and, in step 2b, can return the confirmation ID to application 220. As described below, the confirmation ID can be subsequently used to identify files containing the requested dataset. Accordingly, application 220 can store the confirmation ID.

Figure 4C:
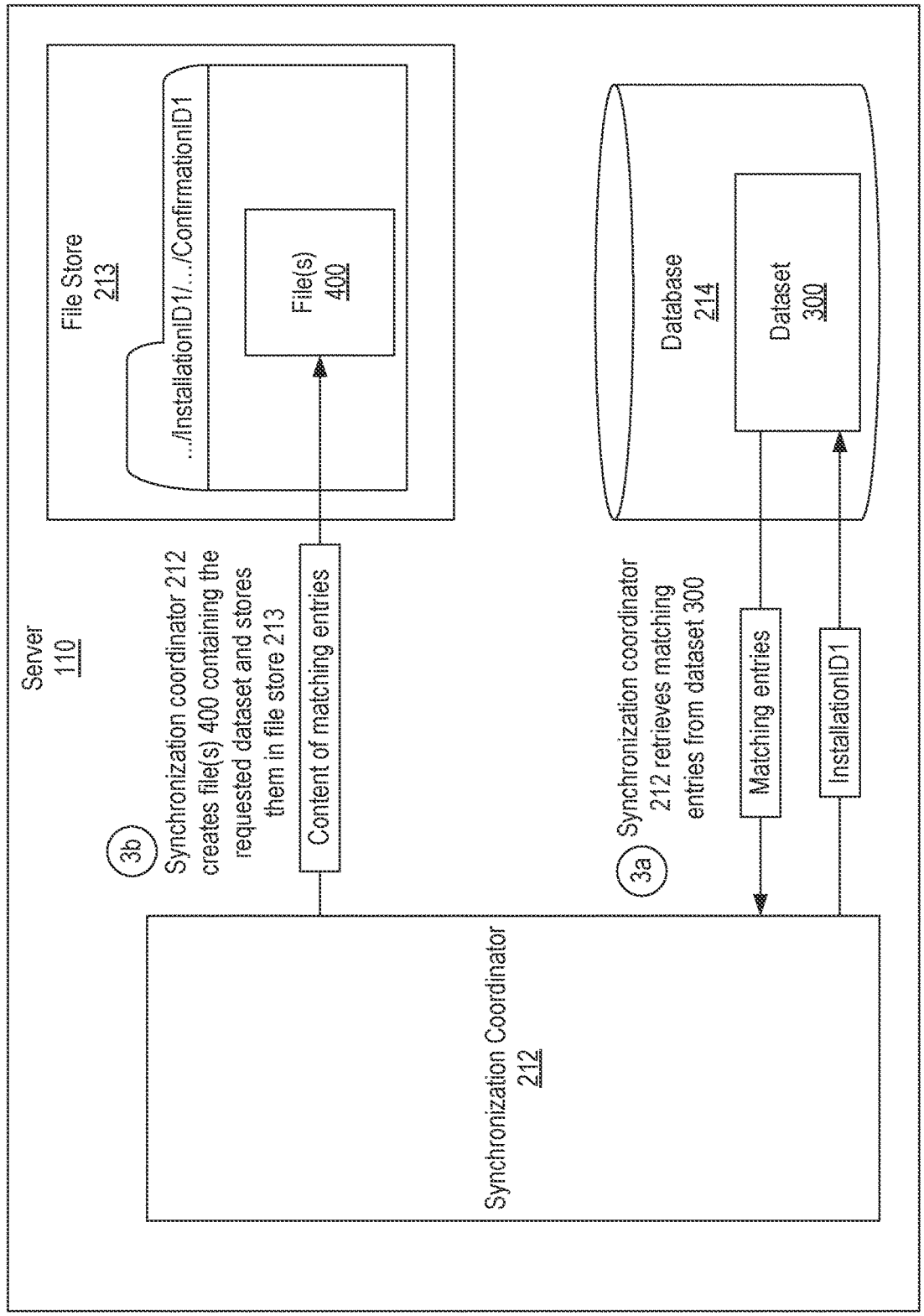

Turning to FIG. 4C, in step 3a, synchronization coordinator 212 can use the identifier(s) that application 220 specified in its request for a dataset (InstallationID1) to retrieve matching entries from dataset 300 in database 214. In this example, synchronization coordinator 212 can retrieve each entry in the asset table that includes InstallationID1 and each entry in the task entry that is associated with a retrieved entry in the asset table. For example, if InstallationID1 represents all assets at a particular location, the matching entries retrieved in step 3a can include each entry for assets at the particular location and each task associated with such assets. In some embodiments, synchronization coordinator 212 may only identify and retrieve matching entries that have changed since a previous request from application 220 so as to not cause application 220 to retrieve portions of the requested dataset that it already stores in local database 221.

In step 3b, synchronization coordinator 212 can create one or more files 400 in file store 213 that contain the entries retrieved in step 3a. Files 400 can be stored at a location defined using the confirmation ID. For example, synchronization coordinator 212 could create a container in file store 213 for storing files 400 where the path for the container includes the confirmation ID. In the depicted example, files 400 are shown as being stored in a container with a path of . . . /InstallationID1/ . . . /ConfirmationID1. Accordingly, by knowing the installation ID and the confirmation ID, a component, such as application 220, can know where files 400 can be obtained.

In some embodiments, files 400 can be in a structured data format, such as JSON. Also, in some embodiments, files 400 can be compressed, such as via the standard GNU zip compression algorithm. Additionally, files 400 can be limited to a certain size such that the number of files that synchronization coordinator 212 creates is dependent on the amount of data and/or the number of entries/objects in the dataset. As an example, if a max of 5000 objects may be included in a file and the requested dataset includes 10,000 objects (e.g., 10,000 objects representing assets, tasks, etc.), files 400 could be 1.json.gz and 2.json.gz. In some embodiments, synchronization coordinator 212 can also create a manifest file identifying the other files. Using the same example as above, files 400 could also include a file named manifest.json which identifies 1.json.gz and 2.json.gz and possibly their contents. Such a manifest can facilitate retrieval of the files.

Figure 4D:
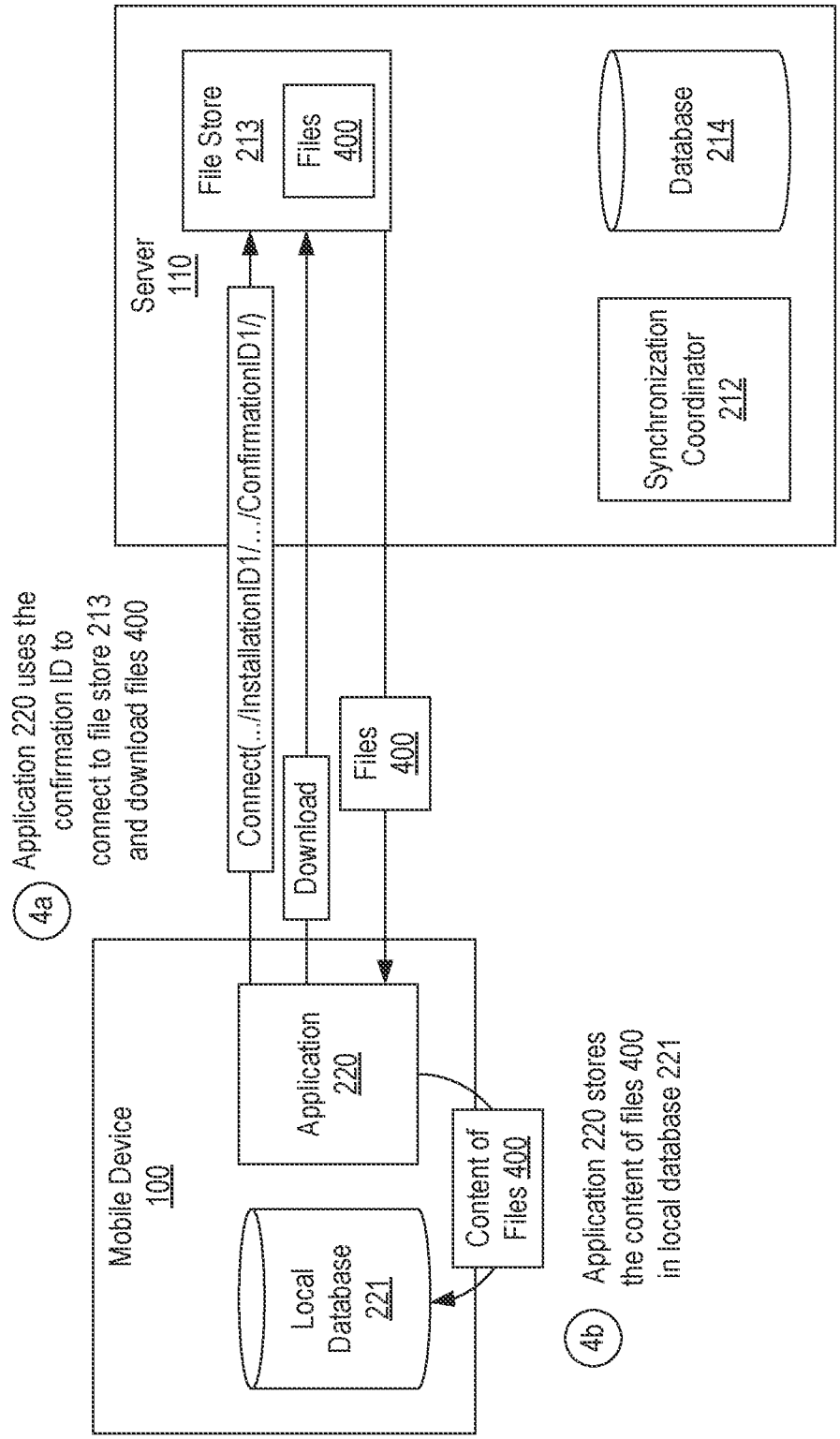

Turning to FIG. 4D, in step 4a, application 220 can use the confirmation ID to connect to file store 213 to retrieve files 400. APIs 210 are removed in FIG. 4D to simplify the figure, but application 220 could connect to file store 213 via APIs 210 in some embodiments. As an example of this step, application 220 could use ConfirmationID1, and possibly other IDs such as InstallationID1, to connect to the container/directory in file store 213 where synchronization coordinator 212 stored files 400 and can then download all files stored in the container/directory. Continuing the example from above, this may result in application 220 obtaining the files 1.json.gz, 2.json.gz and manifest.json. In step 4b, application 220 can store the content of files 400 in local database 221. For example, application 220 could parse manifest.json to determine whether it received each of files 400 and could decompress 1.json.gz and 2.json.gz, parse their contents, and write the contents to local database 221. In this way, application 220 can synchronize local database 221 with dataset 300 in database 214 using file transfers.

Figure 4E:
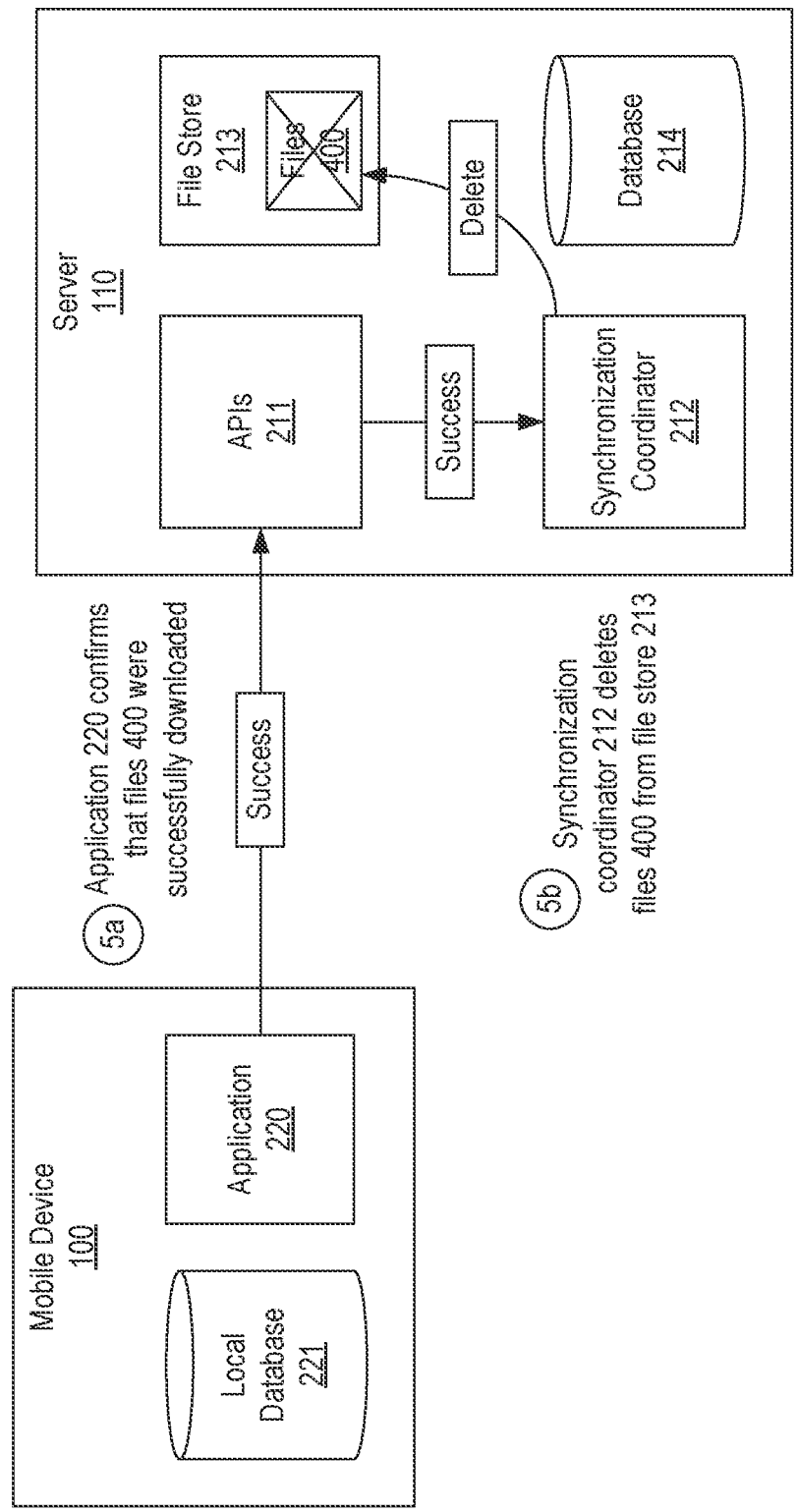

Turning to FIG. 4E, in step 5a, application 220 can provide confirmation to synchronization coordinator 212 that it successfully obtained and processed files 400. For example, application 220 could use the manifest to confirm that it obtained all files that were created for its request for a dataset, and if so, could send confirmation to synchronization coordinator 212. In some embodiments, this confirmation could include the confirmation ID that was created for the request (e.g., ConfirmationID1). In other words, the confirmation ID can be used to confirm to the server that application 220 successfully downloaded and processed all files associated with the confirmation ID. In some embodiments, synchronization coordinator 212 can use the receipt of the confirmation ID to update a synch table that it employs to track the state of each instance of application 220 (i.e., to track which model objects have been synchronized to each mobile device). In some embodiments, synchronization coordinator 212 could use the synch table to determine which model objects need to be synchronized in response to a request for a data set (e.g., by only sending model objects that contain new or updated data relative to what was previously sent). In step 5b, synchronization coordinator 212 can delete files 400 from file store 213. For example, synchronization coordinator 212 could use the confirmation ID provided in step 5a to identify the container/directory in which files 400 are stored and could then delete them.

One benefit of using file transfers to synchronize local database 221 is that application 220 can obtain the requested dataset even when it is not active on mobile device 100. For example, application 220 could be configured to allow a user to request synchronization of local database 221. In response to a user's request, application 220 could initiate the process represented in FIGS. 4A-4E. Because the requested dataset is transferred as files 400, application 220 can perform the transfer, which could take a relatively long time particularly over a slow connection, even when mobile device 100's screen is powered off or application 220 is otherwise not active. Application 220 could also or alternatively be configured to initiate the process represented in FIGS. 4A-4E in response to a push notification from synchronization coordinator 212. Synchronization coordinator 212 could be configured to provide such a push notification when dataset 300 is updated such as when an application 220 on another mobile device 100 synchronizes changes it made to dataset 300.

With local database 221 synchronized with dataset 300, the user of mobile device 100 can use application 220 to access and update dataset 300 (or the portions of dataset 300 that were retrieved) even while mobile device 100 does not have connectivity to server 110. For example, the user could use application 220 to identify which tasks should be performed on assets on a given day and, after performing such tasks, could update dataset 300 stored in local database 221 accordingly. After such changes are made, application 220 can use files in a similar manner to synchronize the changes back to dataset 300 in database 214.

Figure 5A:
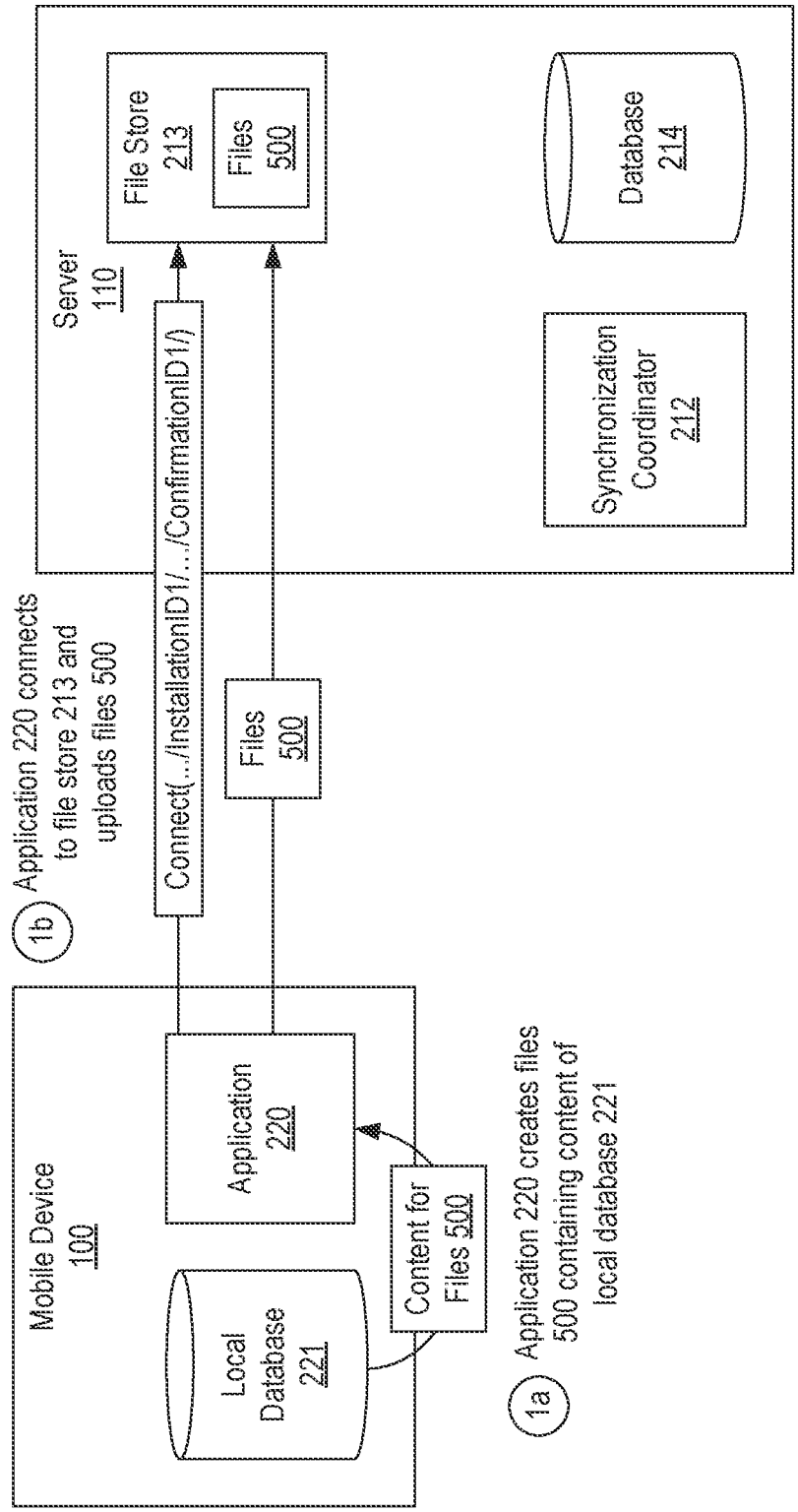
FIGS. 5A-5C provide an example of how a dataset can be synchronized from a mobile device using files in accordance with one or more embodiments of the present invention.
Figure 5B:
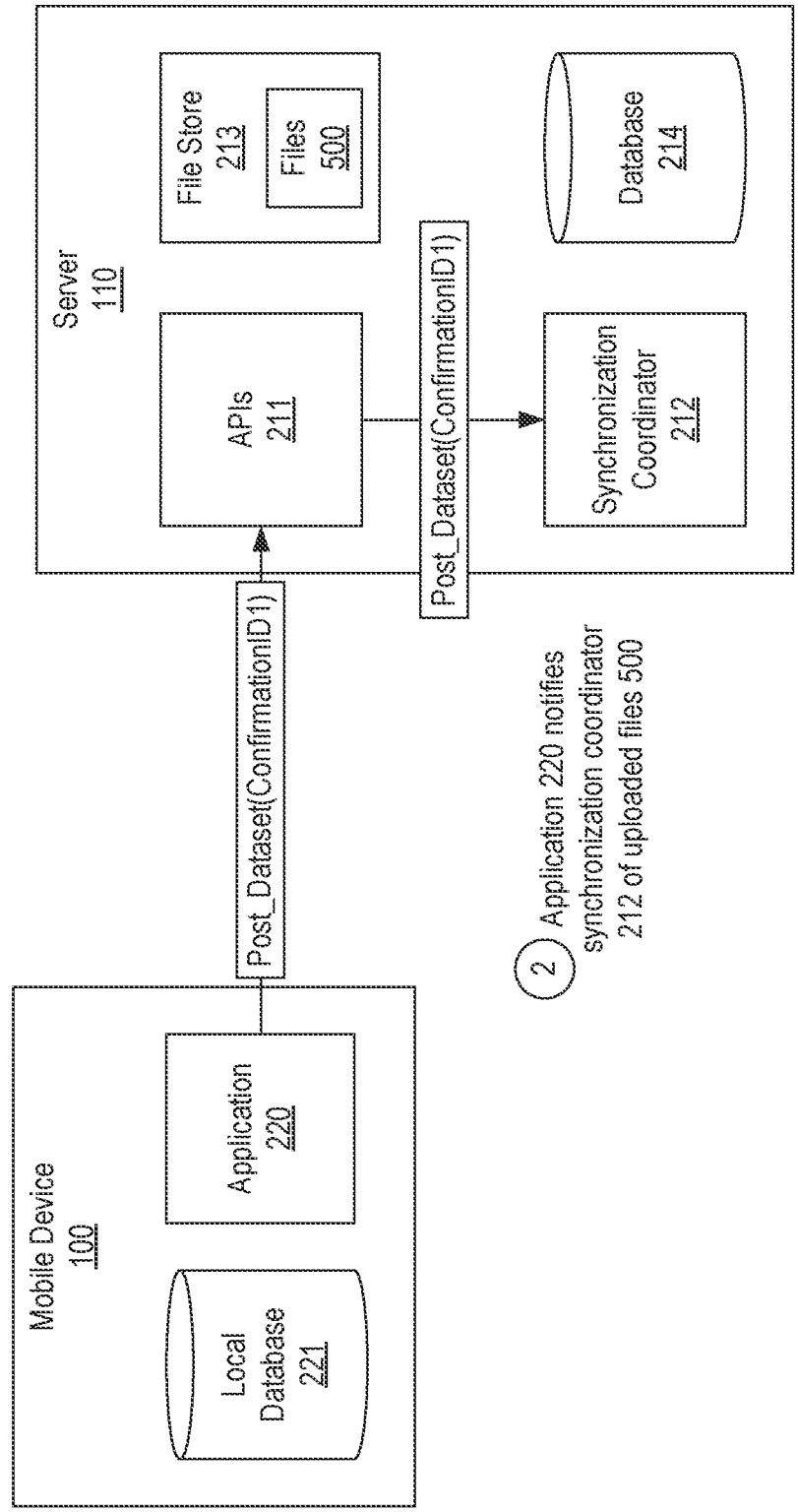
Figure 5C:
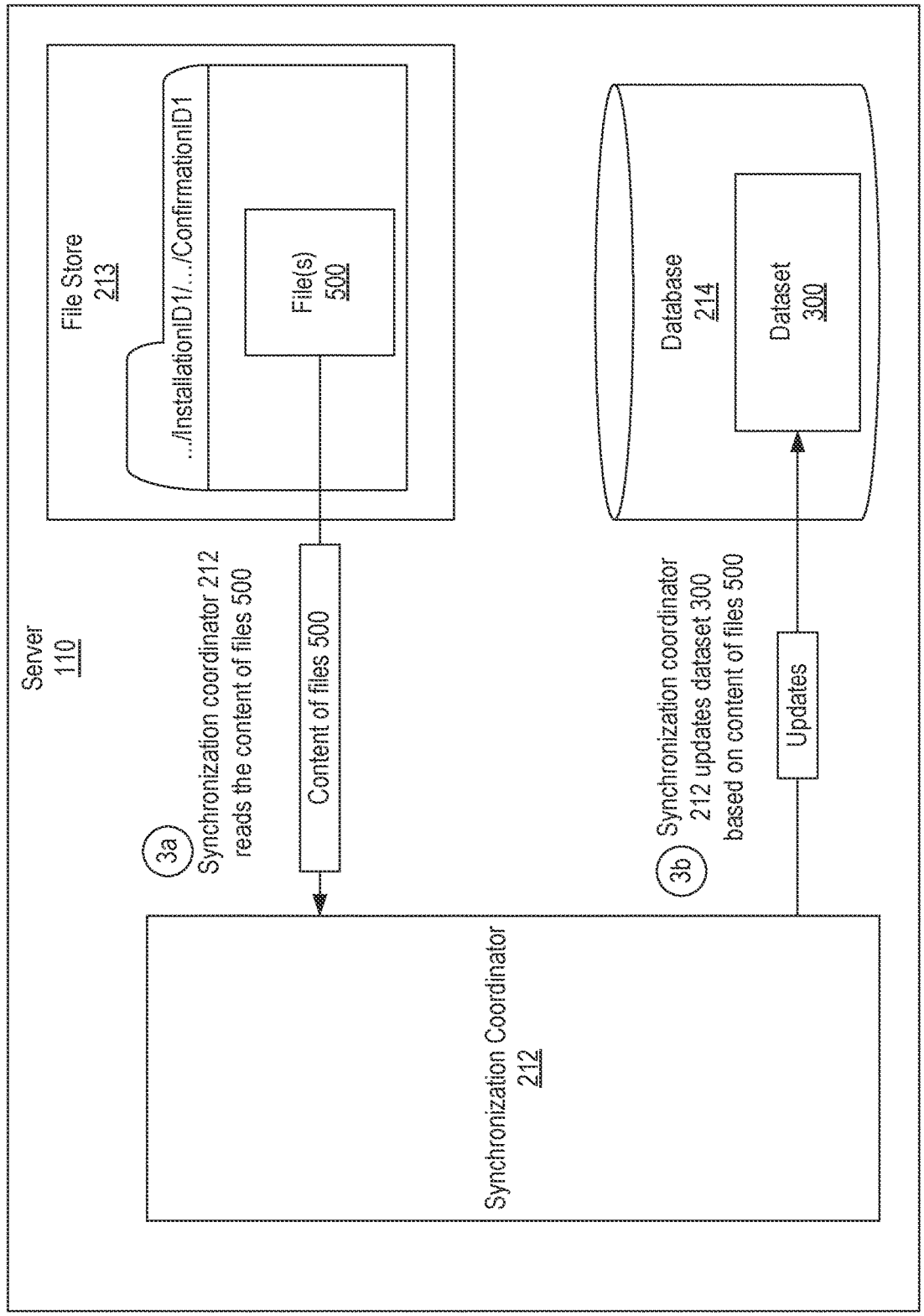

FIGS. 5A-5C provide an example of functionality that distributed system 200 can perform to allow application 220 to synchronize changes made to local database 221 back to database 214. This example is also based on dataset 300 shown in FIG. 3 and continues the example of FIGS. 4A-4E. It will be assumed that the user used application 220 to provide input that changed at least one entry/object in local database 221 such that dataset 300 in database 214 is no longer up to date.

Turning to FIG. 5A, in step 1a, application 220 can create one or more files 500 containing content of local database 221. Application 220 could create files 500 at any suitable time. For example, in some embodiments, application 220 could create files 500 in response to a user's request to synchronize changes made to local database 221 to dataset 300 in database 214. In some embodiments, application 220 could create files 500 in response to a push notification received from synchronization coordinator 212. In step 1b, application 220 could connect to file store 213 to upload files 500. For example, application 220 could again use the confirmation ID it received from synchronization coordinator 212 when downloading files 400 to store files 500 in the container for that confirmation ID.

In some embodiments, application 220 could request a token (e.g., a shared access signatures (SAS) token) to allow it to access file store 213 directly without employing APIs 211. For example, in conjunction with creating file(s) 500, application 220 could request a token via APIs 211. Then, application 220 can initiate the transfer of file(s) 500 to file store 213 directly using the token rather than transferring file(s) via APIs 211. Because application 220 can access file store 213 directly, it can leverage file transfer tools on mobile device 100 to cause file(s) 500 to be transferred to file store 213 even when application 220 is not active on mobile device 100. After file(s) 500 are transferred to file store 213, application 220 can notify synchronization coordinator 212 as represented in step 2 of FIG. 5B. Because application 220 can access file store 213 directly, long-running posts to APIs 211 can be minimized.

In some embodiments, files 500 could be structured in a similar manner as files 400. For example, application 220 could create one or more JSON files containing the content of local database 221 and a manifest describing such files. In some embodiments, application 220 could create a compressed package (e.g., a .zip file) containing all such files.

Turning to FIG. 5B, in conjunction with storing files 500 in file store 213, in step 2, application 220 can notify synchronization coordinator 212. For example, application 220 could submit a "post dataset" request via APIs 211 which identifies the confirmation ID (ConfirmationID1) and represents that files 500 have been stored in file store 213.

Turning to FIG. 5C, in step 3a, synchronization coordinator 212 can use the confirmation ID provided by application 220 to access files 500 in file store 213. For example, synchronization coordinator 212 could read the content of each file stored at /InstallationId1/ . . . /ConfirmationID1 in file store 213. In step 3b, synchronization coordinator 212 can update dataset 300 in database 214 based on the contents of files 500. For example, synchronization coordinator 212 could parse the contents of files 500 to identify any updates that should be synchronized to dataset 300 in database 214 and could then apply such updates.

In this way, application 220 can transfer its locally stored version of dataset 300 to synchronization coordinator 212 using files 500. As with the transfer of files 400, one benefit of using file transfers to synchronize changes in local database 221 back to database 214 is that application 220 can transfer the changes even when it is not active on mobile device 100.

Although not shown, after updating dataset 300 based on the content of files 500, synchronization coordinator 212 can send confirmation to application 220. Also, if any errors occur while attempting to update dataset 300, synchronization coordinator 212 can queue the attempt to cause it to be repeated until it is successful.

As can be seen, by implementing embodiments of the present invention, relatively large data transfers can be performed between server 110 and mobile devices 100 without needing to keep application 220 active on mobile devices 100 while the transfer is performed. In this way, local database 221 can be efficiently synchronized with database 214 even when mobile devices 100 have intermittent and/or slow connectivity to server 110. Embodiments of the present invention can therefore be particularly beneficial for distributed systems that are used to manage assets that are located in remote areas without consistent connectivity.

In some embodiments, various optimizations may be employed in distributed system 200. The following description provides some examples of such optimizations any one or more of which could be implemented in some embodiments.

Figure 6A:
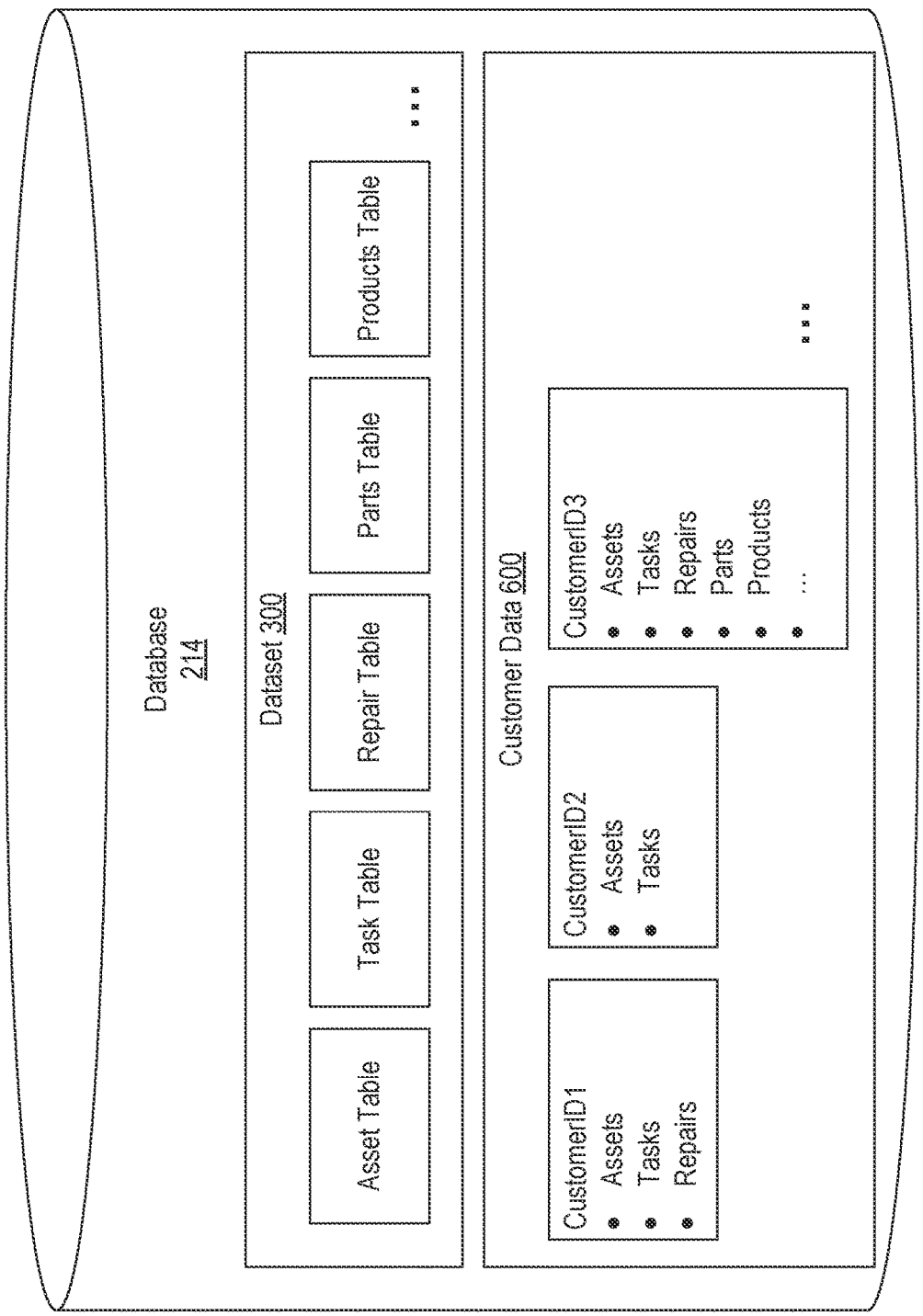
FIGS. 6A and 6B provide an example of how the distributed system may be configured to synchronize only model objects representing features to which a customer is subscribed.
Figure 6B:
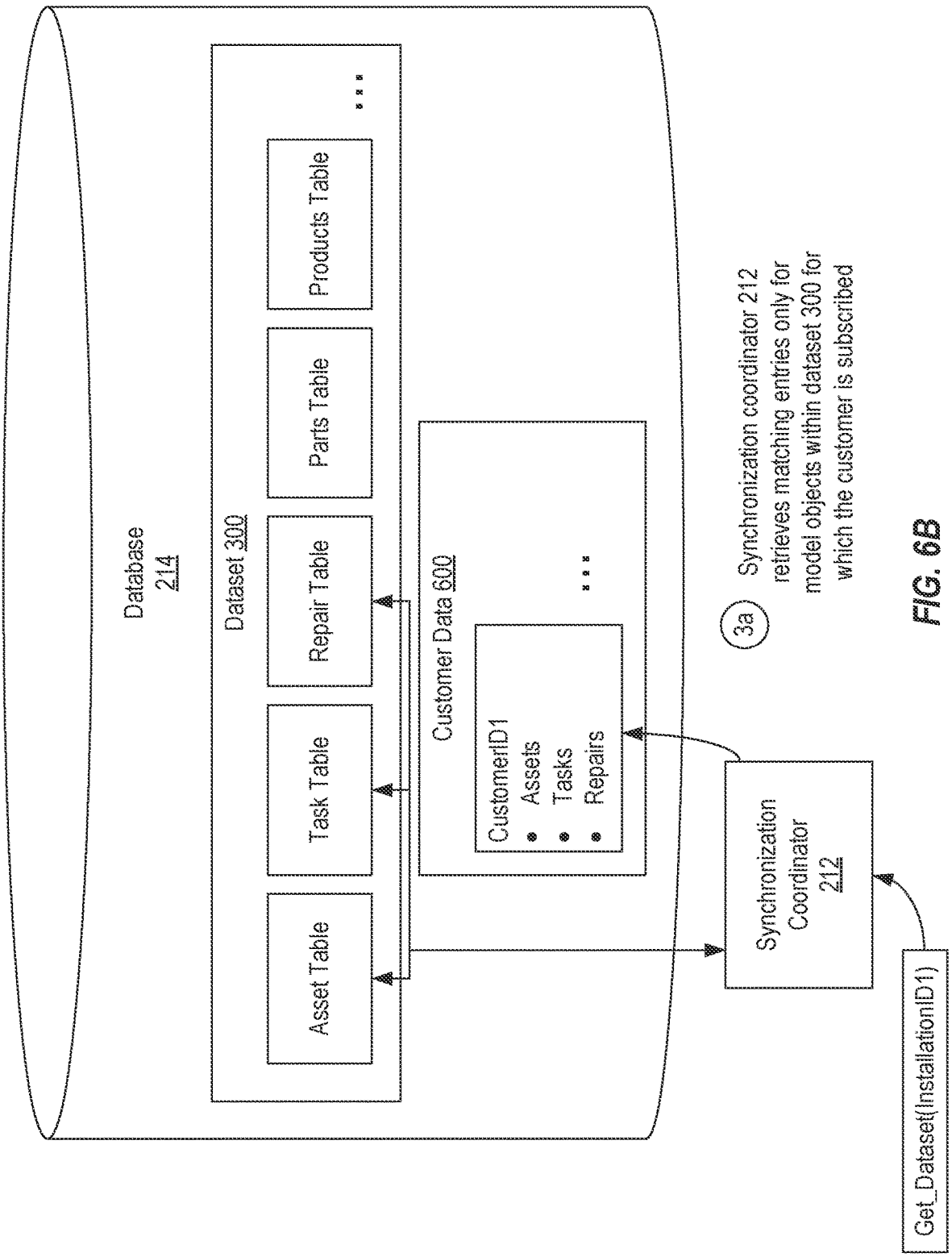

FIGS. 6A and 6B provide an example of how distributed system 200 may be configured to synchronize only model objects representing features to which a customer is subscribed (or that the customer otherwise uses). As stated above, a model object is a mobile-side data structure that represents a particular type of server-side data. FIG. 6A provides an example where dataset 300 includes asset table and task table, as shown in FIG. 2, as well as a repair table, a parts table, a products table, etc. Each of these tables can correspond with a particular model object. In typical implementations, distributed system 200 would employ a large number of model objects such as model objects for companies, employees, programs, messages, purchase orders, service tickets, and many others.

In the examples of FIGS. 4A-5C, it was assumed that synchronization coordinator 212 retrieved all model objects in dataset 300 in response to application 220's request for the dataset (i.e., it was assumed that all data associated with the particular customer was synched). However, doing so can lead to excessive processing on server 110. For example, to retrieve/synch all model objects in dataset 300, synchronization coordinator 212 would need to query each table in dataset 300. In some embodiments, however, dataset 300 may include data for model objects that a particular customer does not use (e.g., that the customer's subscription does not include). For example, in FIG. 6A, database 214 is shown as storing customer data 600 that indicates that the customer, CustomerID1, only subscribes to assets, tasks and repairs and that the customer, CustomerID2, only subscribes to assets and tasks.

In some embodiments, synchronization coordinator 212 can be configured to leverage this customer data 600 to synchronize only model objects that a customer uses/subscribes to. FIG. 6B, which is based on FIG. 4C, provides an example of how this may be accomplished. As shown, in response to receiving a request for a dataset, synchronization coordinator 212 can access customer data 600 to determine which model objects are used by the customer to which the request pertains. In the depicted example, this may entail determining that the request pertains to CustomerID1 and accessing customer data 600 to determine that CustomerID1 only subscribes to assets, tasks, and repairs. In response, step 3a could entail querying only the asset table, the task table, and the repair table to retrieve/build the asset, task, and repair model objects for CustomerID1. This is in contrast to also querying parts table, products table, etc. In addition to the reduction in queries and the corresponding reduction in the load on server 110, this optimization can also reduce the size of file(s) 400 and the load on mobile device 100 when processing files 400 to synchronize local database 221. This optimization could also be applied on a per-user basis. For example, a request for a dataset could be associated with a user of a customer, and synchronization coordinator 212 could determine that the user only uses a subset of model objects that the customer uses. In such a case, synchronization coordinator 212 could query and synch only the model objects that the user uses.

In some embodiments, synchronization coordinator 212 could be configured to dynamically arrange the sequence of queries to optimize performance of server 110. For example, synchronization coordinator 212 can be configured to monitor how long each query of dataset 300 takes (e.g., how long a query of the asset table takes, how long a query of the task table takes, etc.). In some embodiments, this monitoring can be performed on a per-customer basis (e.g., how long a query of the asset table takes to obtain asset data for CustomerID1, etc.). Synchronization coordinator 212 can then use these query durations to create a sequence of shorter-running queries to run in parallel with one or more longer-running queries. For example, if synchronization coordinator 212 determines that a query of the asset table typically takes 10 seconds while queries of the task, repair and parts tables take 3 seconds each, synchronization coordinator 212 could configure the queries of the task, repair and parts tables to be performed sequentially and in parallel with the query of the asset table. In this way, the sequenced shorter-running queries will complete at about the same time as the longer-running query. Due to the sequencing of the queries, as opposed to running all the queries in parallel, server 110 can experience a reduced load when responding to a request for a dataset. This reduced load can be accomplished without slowing down the synchronization process because file(s) 400 cannot be completed until all the queries have completed.

Figure 7:
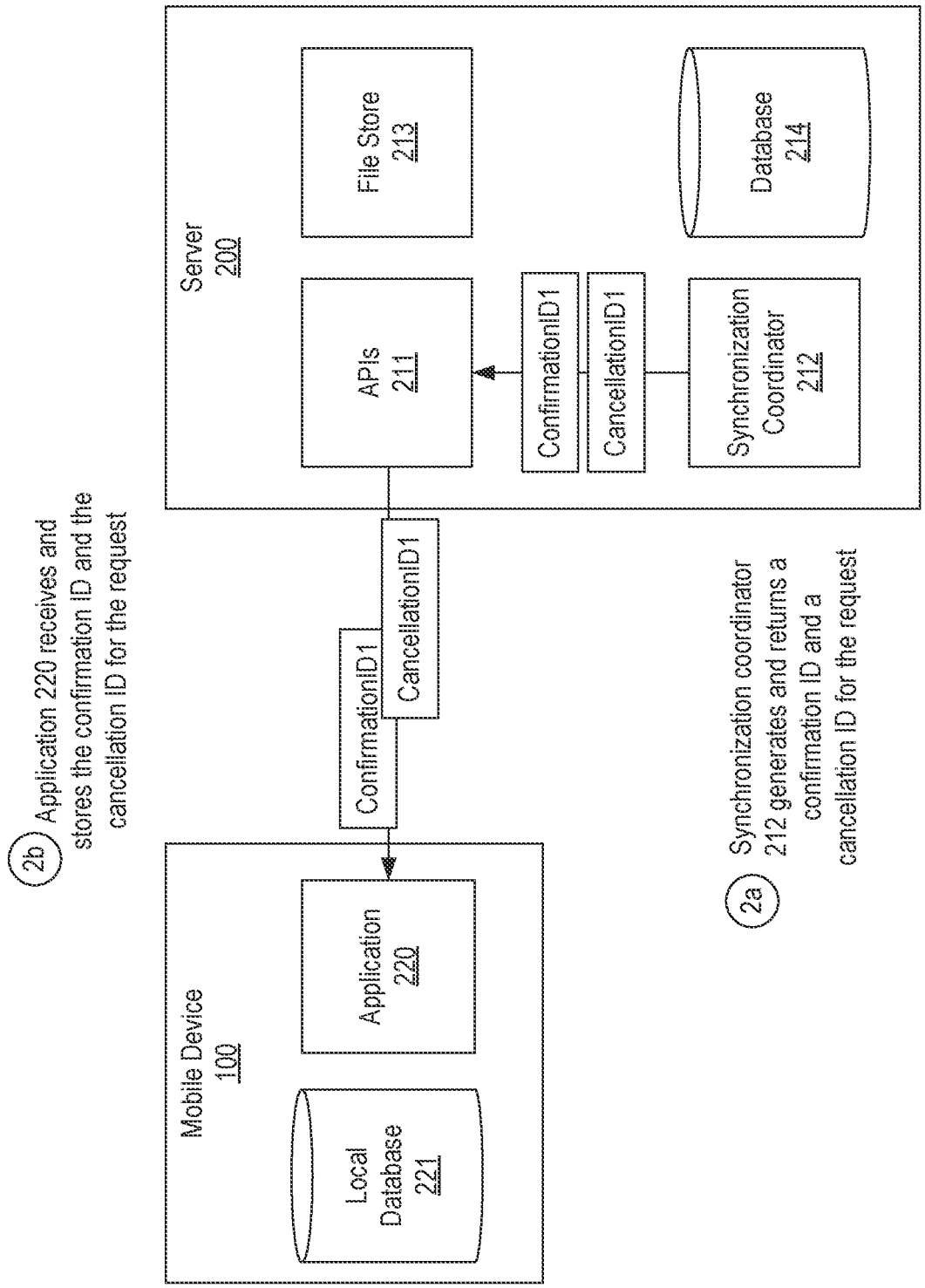
FIG. 7 provides an example of an optimization that the distributed system may employ in some embodiments.

FIG. 7 provides an example of another optimization that distributed system 200 may employ in some embodiments. FIG. 7 is based on FIG. 4B and represents that synchronization coordinator 212 may generate and send a cancellation ID in addition to the confirmation ID for the request for a dataset. Application 220 can use the cancellation ID to request cancellation of a request for a dataset. For example, as represented in FIG. 4C, after providing the confirmation ID, synchronization coordinator 212 may run a number of queries to retrieve entries (e.g., to retrieve the model objects) and may then create file(s) 400 to contain these matching entries. While synchronization coordinator 212 is performing this functionality, application 220 could determine that it no longer needs the requested dataset. For example, the user of application 220 could provide input that makes the requested dataset obsolete or could navigate away from a webpage/interface in which the requested dataset was to be populated. Regardless of why application 220 may determine that it no longer needs the requested dataset, application 220 can cause synchronization coordinator 212 to cancel its attempt to create the requested dataset by submitting the cancellation ID via APIs 211. Because the cancellation ID is generated in response to the request and can therefore be associated with the request, synchronization coordinator 212 can know which request is to be cancelled in response to receiving a particular cancellation ID. In this way, application 220 can cause synchronization coordinator 212 to forego unnecessary processing thereby reducing the load on server 110.

In some embodiments, server 110 may be configured to implement message queues to optimize the handling of files received from mobile applications 220. For example, APIs 211 can be configured to post a message to the message queues in response to receiving a notification that file(s) 500 have been transferred to file store 213. One or more functions that subscribe to the topic of the message can then be notified and can access the message to determine what functionality needs to be performed to process file(s) 500. If processing of the message fails, the message can be requeued to cause the subscribing function(s) to try to process the message again. If processing fails after a threshold number of attempts, an alert can be raised to cause an administrator to analyze the message, perform any manual intervention that may be necessary, and then requeue the message for processing. This optimization can ensure that no data transferred from a mobile device is lost.

Embodiments of the described systems and methods comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions can be, for example, binaries, intermediate format instructions such as assembly language or P-Code, or even source code.

Those skilled in the art will appreciate that the invention can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The described systems and methods can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices. An example of a distributed system environment is a cloud of networked servers or server resources. Accordingly, the present invention can be hosted in a cloud environment.

The described systems and methods can be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by a synchronization coordinator that executes on a server, for synchronizing a dataset in a distributed system, the method comprising:
   receiving a request for a dataset from an application executing on a mobile device; and
   in response to the request for the dataset:
      obtaining a confirmation ID representing the dataset and used as a unique element in a path to a container in a file store;
      sending the confirmation ID to the application;
      accessing a database to retrieve the dataset;
      creating one or more files that contain the dataset;
      creating the container in the file store at the path to the container that includes the confirmation ID such that the confirmation ID forms a unique element in the path to the container in the file store; and
      storing the one or more files in the container in the file store enabling the application to retrieve the one or more files by sending, as part of a network request, a file access request that specifies the path to the container that includes the confirmation ID in the path.

2. The method of claim 1, wherein the request for the dataset specifies an installation ID, and wherein accessing the database to retrieve the dataset comprises retrieving the dataset using the installation ID.

3. The method of claim 2, wherein the installation ID represents a location.

4. The method of claim 1, wherein the obtaining the confirmation ID comprises creating the confirmation ID.

5. The method of claim 1, wherein the one or more files include a first file containing at least a portion of the dataset and a second file comprising a manifest.

6. The method of claim 1, wherein the dataset defines assets and tasks pertaining to the assets.

7. The method of claim 1, wherein the confirmation ID is a last element in the path to the container.

8. The method of claim 1, further comprising:
   receiving confirmation from the application that the application obtained the one or more files; and
   deleting the container from the file store.

9. The method of claim 1, further comprising:
   receiving a notification from the application that one or more additional files have been stored in the container in the file store, the one or more additional files containing changes to the dataset that were made on the mobile device;
   using the confirmation ID to access the one or more additional files in the container in the file store; and
   using the one or more additional files to synchronize the changes to the dataset that were made on the mobile device with the dataset stored in the database.

10. The method of claim 9, further comprising:
    in response to the notification, posting a message to a message queue, the message representing that the one or more additional files have been stored in the container in the file store.

11. The method of claim 1, further comprising:
    determining a subset of model objects that pertain to a requester of the dataset;
    wherein accessing the database to retrieve the dataset comprises accessing the database to retrieve only the subset of model objects.

12. The method of claim 11, wherein the requester comprises a customer or a user of the customer.

13. The method of claim 1, wherein the accessing the database to retrieve the dataset comprises creating a sequence of shorter-running queries and executing the sequence in parallel with one or more longer-running queries.

14. The method of claim 1, further comprising:
    sending a cancellation ID to the application that the application uses to cause the synchronization coordinator to cease processing the request for the dataset.

15. A method, performed by an application that executes on a mobile device, for synchronizing a dataset in a distributed system, the method comprising:
    sending a request for a dataset to a synchronization coordinator that executes on a server;
    in response to sending the request for the dataset, receiving a confirmation ID from the synchronization coordinator, the confirmation ID having been created to represent the dataset and used as a unique element in a path to a container in a file store in which one or more files containing the dataset are to be stored;
    using the confirmation ID to access the container in the file store by sending, as part of a network request, a file access request that specifies the path to the container that includes the confirmation ID in the path;

downloading the one or more files stored in the container in the file store;
extracting the dataset from the one or more files; and
storing the dataset in a local database on the mobile device.

16. The method of claim 15, wherein the confirmation ID is a last element in the path to the container.

17. The method of claim 15, wherein the request for the dataset includes an installation ID, and wherein the path to the container also includes the installation ID.

18. The method of claim 15, wherein the application downloads the one or more files stored in the container in the file store when a screen of the mobile device is turned off.

19. The method of claim 15, further comprising:
receiving input from a user that changes the dataset stored in the local database on the mobile device.

20. The method of claim 19, further comprising:
creating one or more additional files that include the changed dataset; and
storing the one or more additional files in the container in the file store.

21. The method of claim 20, further comprising:
sending a notification to the synchronization coordinator that the one or more additional files are stored in the container in the file store.

22. The method of claim 21, wherein the notification includes the confirmation ID enabling the synchronization coordinator to identify the location container in the file store using the confirmation ID.

23. One or more computer storage media storing computer executable instructions which when executed implement a method for synchronizing changes in a distributed system, the method comprising:
receiving, at a synchronization coordinator, a request for a dataset from an application executing on a mobile device, the dataset being stored in a database on a server;
in response to the request for the dataset, obtaining and sending, by the synchronization coordinator, an identifier for the request to the application, the identifier to be used as a unique element in a path to a container in a file store;
creating the container in the file store at the path to the container that includes the identifier such that the identifier forms the unique element in the path to the container in the file store;
storing, by the synchronization coordinator, one or more files in the container in the file store, the one or more files containing the dataset;
using, by the application, the identifier for the request to access the container in the file store in downloading the one or more files, wherein the using, by the application, the identifier for the request comprises sending, as part of a network request, a file access request that specifies the path to the container that includes the identifier in the path for the request;
extracting, by the application, the dataset from the one or more files; and
storing, by the application, the dataset in a local database on the mobile device.

24. The one or more computer storage media of claim 23, wherein the method further comprises:
updating, by the application, the dataset in the local database;
creating, by the application, one or more additional files that contain the updated dataset; and
using, by the application, the identifier for the request to upload the one or more additional files to the container in the file store.

25. The one or more computer storage media of claim 24, wherein the method further comprises:
using, by the synchronization coordinator, the identifier for the request to access the container in the file store to retrieve the one or more additional files; and
synchronizing, by the synchronization coordinator, the updated dataset to the dataset stored in the database on the server.

\* \* \* \* \*